(12) United States Patent
Lincul

(10) Patent No.: US 7,690,670 B1
(45) Date of Patent: Apr. 6, 2010

(54) TRAILER HITCH ALIGNMENT AID

(76) Inventor: Brigitte Lincul, 2820 West Leila Ave., Tampa, FL (US) 33611

( * ) Notice: Subject to any disclaimer, the term of this patent is extended or adjusted under 35 U.S.C. 154(b) by 198 days.

(21) Appl. No.: 12/120,655

(22) Filed: May 15, 2008

(51) Int. Cl.
  *B08B 21/00* (2006.01)
(52) U.S. Cl. ..................................... 280/477
(58) Field of Classification Search ................... 280/477
  See application file for complete search history.

(56) References Cited

U.S. PATENT DOCUMENTS

| | | | |
|---|---|---|---|
| 3,901,536 A | 8/1975 | Black | |
| 4,054,302 A | 10/1977 | Campbell | |
| 4,552,376 A | 11/1985 | Cofer | |
| 6,120,052 A | 9/2000 | Capik et al. | |
| 6,827,363 B1 | 12/2004 | Amerson | |
| 7,017,933 B2 | 3/2006 | Mickley | |
| 7,354,057 B2* | 4/2008 | Milner et al. | ............... 280/477 |
| 7,391,303 B2* | 6/2008 | Ball | ........................... 340/431 |
| 2006/0261574 A1 | 11/2006 | Milner et al. | |

* cited by examiner

*Primary Examiner*—Kevin Hurley

(57) ABSTRACT

The invention is a trailer tongue alignment accessory that attaches to the tongue of the trailer. The invention includes a mounting assembly, three lighted posts, and position sensing means. The position sensing means comprises a laser projector that is attached to the mounting assembly, and a reflector that is attached to the trailer hitch.

8 Claims, 3 Drawing Sheets

TRAILER HITCH ALIGNMENT AID

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of trailer hitch accessories, more specifically, a trailer hitch alignment aid that attaches near the tongue of a trailer.

For as long as trailers have been around, there has been a need to prevent the unwanted damage associated with backing a towing vehicle into a trailer tongue, and furthermore to assist the driver in aligning said trailer with the trailer hitch of the towing vehicle. Alignment of a trailer involves both left to right as well as front to rear alignment. That being said, the present invention seeks to overcome the difficulties associated when aligning a trailer with the towing vehicle.

B. Discussion of the Prior Art

As a preliminary note, it should be stated that there is an ample amount of prior art that deals with trailer alignment accessories. As will be discussed immediately below, no prior art discloses an alignment accessory that utilizes a sensing means and of which the assemblage attaches adjacent the trailer tongue.

The Mickley Patent (U.S. Pat. No. 7,017,933) discloses an illuminated attachment for boat trailers that assists in the alignment and centering thereof. The illuminated attachment is a pair of lighted posts that the user looks at when attempting to align the trailer to the towing vehicle, as opposed to an accessory that attaches near the tongue of the trailer, and includes a sensing means with indicating lights to aid the driver of the towing vehicle. Furthermore, the illuminated attachment is suited for providing left to right alignment and not forward to rearward alignment.

The Milner et al. Patent Application Publication (U.S. Pub. No. 2006/0261574) discloses a trailer hitch alignment system for vehicles that uses a laser beam to guide to align the trailer with the towing vehicle. However, the laser is mounted on the towing vehicle, as opposed to an alignment accessory wherein the sensing means are mounted on the trailer itself and of which senses the location of the trailer hitch on the towing vehicle with respect to the tongue of the trailer itself. Again, the alignment system does not provide feedback as to forward versus reverse movement of the towing vehicle during alignment.

The Campbell Patent (U.S. Pat. No. 4,054,302) discloses a trailer hitch alignment guide that uses a set of illuminated rods attached to a trailer and a vehicle. The illuminated rods do not employ sensing means within themselves, but rather rely upon the driver of the towing vehicle to align the trailer hitch with the trailer tongue, as opposed to an alignment accessory that employs sensing means to align the trailer hitch with the trailer tongue. Again, the alignment guide only provides left to right alignment, and not forward and reverse directional capabilities.

The Black Patent (U.S. Pat. No. 3,901,536) discloses a three-pronged trailer hitch alignment assembly, wherein an indication light is triggered once the vehicle and hitch are aligned as well as having two additional alignment indicating features on the other two prongs. However, the alignment assembly requires an accessory that is mounted on the towing vehicle, and an accessory that is mounted on the trailer, as opposed to an alignment assembly that only requires mounting be made to the trailer.

The Amerson Patent (U.S. Pat. No. 6,827,363) discloses a three-pronged trailer hitch alignment system that uses a triple illumination feature to center and guide a vehicle into the correct position. Again, the alignment assembly requires an accessory that is mounted on the towing vehicle, and an accessory that is mounted on the trailer. Furthermore, the alignment assembly requires physical touching of the two assemblages in order to provide feedback to the driver of the towing vehicle.

The Cofer Patent (U.S. Pat. No. 4,552,376) discloses a trailer hitch guide that utilizes a lamp mounted on the trailer tongue, which projects a beam of light onto a target mounted on the towing vehicle. However, the alignment system requires two components, each of which is mounted to either the trailer or the towing vehicle.

The Capik et al. Patent (U.S. Pat. No. 6,120,052) discloses an optically guided trailer hitching system that includes a pair of light sources that cross when the trailer tongue is aligned with the trailer hitch. The light sources are mounted on the towing vehicle, as opposed to an accessory that attaches to the trailer.

While the above-described devices fulfill their respective and particular objects and requirements, they do not describe a trailer hitch alignment aid that provides for the advantages of the trailer hitch alignment aid. In this regard, the trailer hitch alignment aid departs from the conventional concepts and designs of the prior art.

Therefore, a need exists for an improved trailer hitch alignment aid.

SUMMARY OF THE INVENTION

The invention is a trailer tongue alignment accessory that attaches to the tongue of the trailer. The invention includes a mounting assembly, three lighted posts, and position sensing means. The position sensing means comprises a laser projector that is attached to the mounting assembly, and a reflector that is attached to the trailer hitch.

It is a principle object of the present invention to provide a trailer hitch alignment system that provides feedback as to the alignment of the trailer from left to right, as well as alignment from forwards to rearwards.

It is a further object of the invention to provide a trailer hitch alignment system that is easily mounted onto or adjacent the tongue of the trailer.

It is a further object of the invention to provide a trailer hitch alignment system that is efficient, lightweight, and affordable.

These together with additional objects, features and advantages of the trailer hitch alignment aid will be readily apparent to those of ordinary skill in the art upon reading the following detailed description of presently preferred, but nonetheless illustrative, embodiments of the trailer hitch alignment aid when taken in conjunction with the accompanying drawings.

In this respect, before explaining the current embodiments of the trailer hitch alignment aid in detail, it is to be understood that the trailer hitch alignment aid is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the trailer hitch alignment aid. It is therefore important that the claims be regarded as including such equivalent construction insofar as they do not depart from the spirit and scope of the trailer hitch alignment aid. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
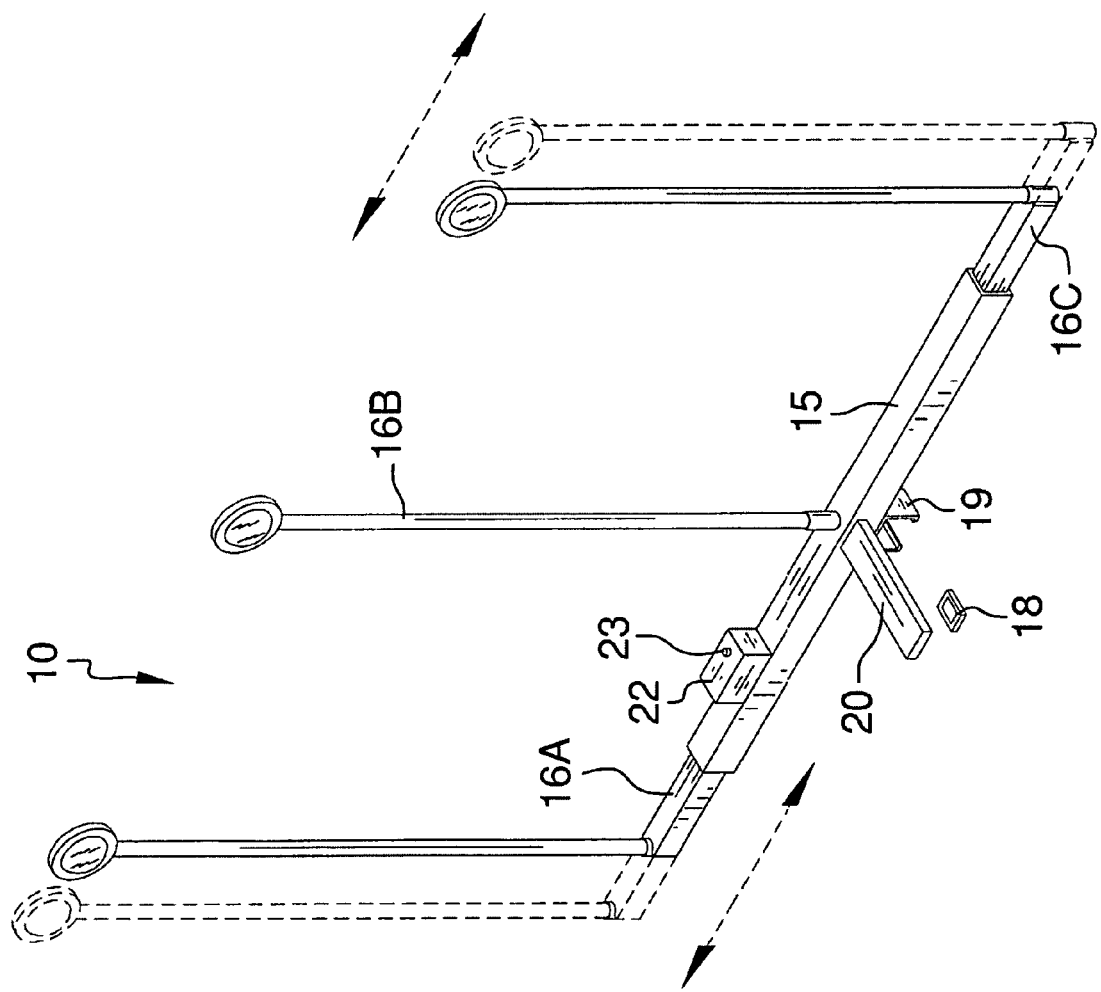
FIG. 1 illustrates an isometric view of the invention by itself.
Figure 2:
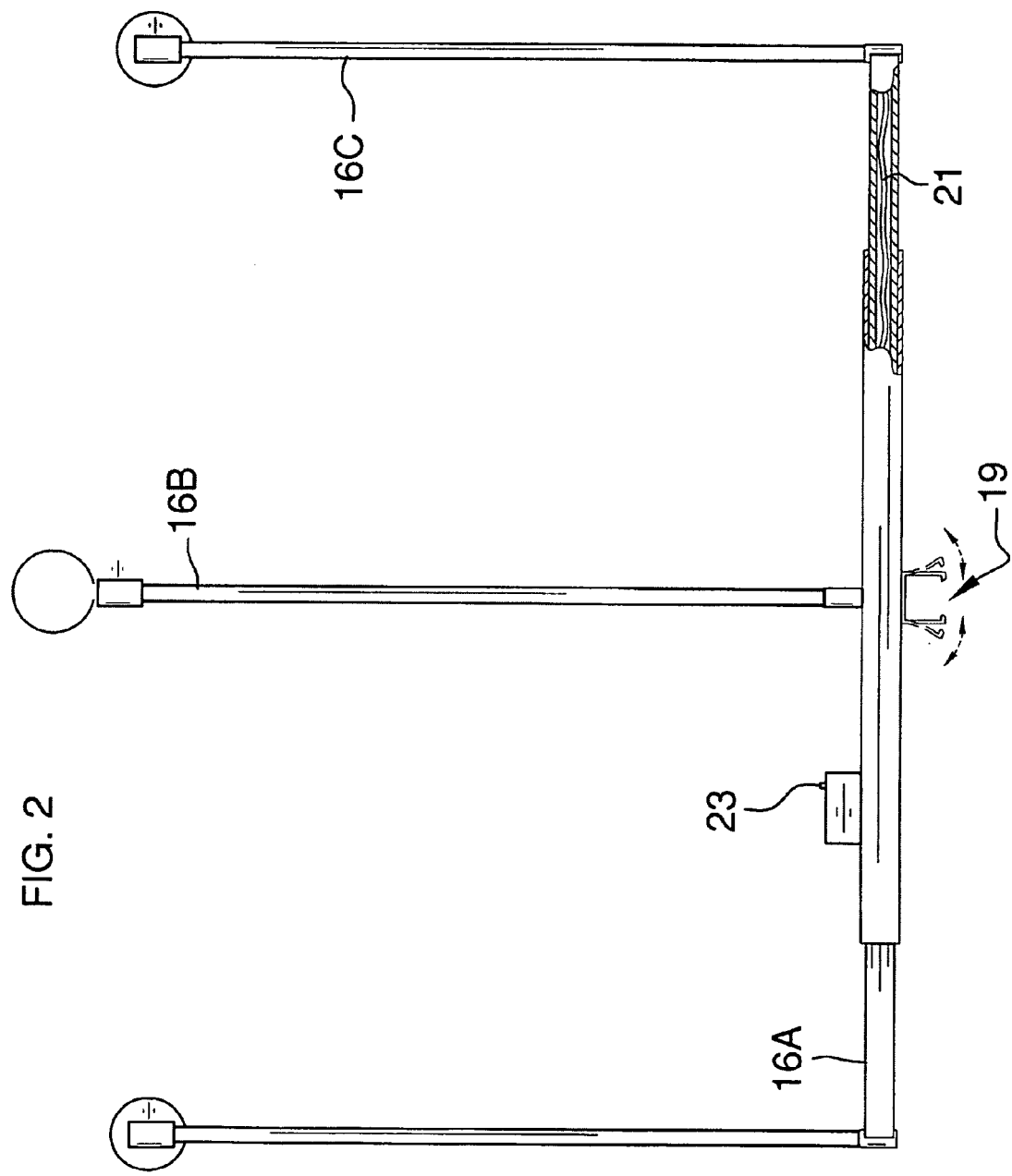
FIG. 2 illustrates a rear view of the invention by itself with a cross-sectional cut away along the right light post, and detail of the flexibility of the spring clamp.
Figure 3:
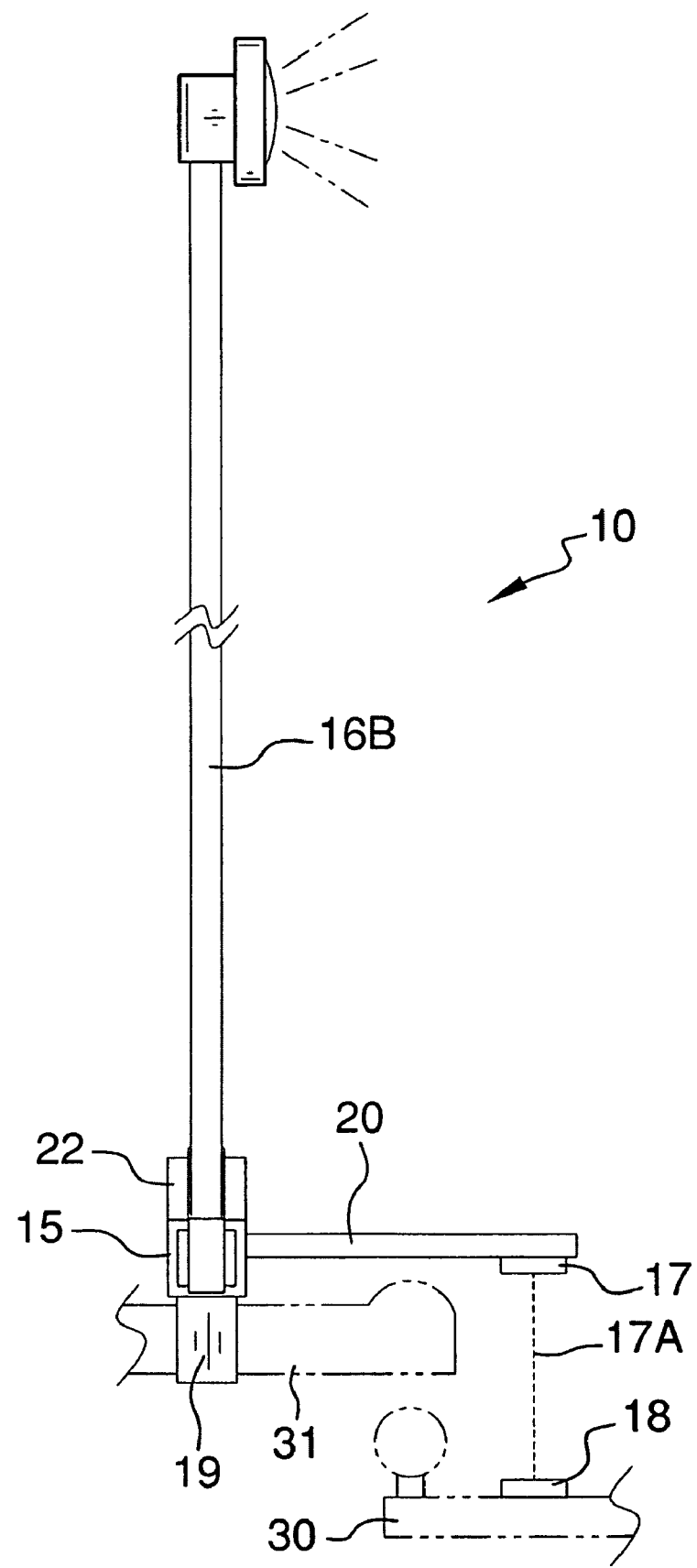
FIG. 3 illustrates a side view of the invention in use.

Detailed reference will now be made to the preferred embodiment of the present invention, examples of which are illustrated in FIGS. 1-3. A trailer hitch alignment system 10 (hereinafter invention) includes a mounting assembly 15, a left light post 16A, a center light post 16B, and a right light post 16C, a laser/sensor 17, a laser reflector 18.

The mounting assembly 15 has a spring clamp 19, laser sensor arm 20. The mounting assembly 15 has a left opening 15A and a right opening 15B to accommodate the left light post 16A and the right light post 16C, as depicted in FIGS. 1 and 2. As depicted in FIG. 2, the extension of the left light post 16A and the right light post 16C with respect to the mounting assembly 15 is capable, and shall be either dictated by the length of the mounting assembly 15 or wiring 21.

It shall be noted that a locking means may be included, which would lock the extended or retracted distal length of the left light post 16A and right light post 16C with respect to the mounting assembly 15.

It shall be further noted that the mounting assembly 15 may be attached to the trailer 31 by other attaching means comprising bolting, welding, screwing, or gluing.

It shall be noted that wiring 21 is located within the left light post 16A, the center light post 16B, and the right light post 16C. The wiring 21 connects to a power box 22, which is mounted on the mounting assembly 15. The power box 22 includes an on/off button 23, and a powering means (not depicted). The powering means (not depicted) may comprise a plurality of batteries, a solar cell array, or a wire that runs to the electrical system of a towing vehicle 30.

The laser/sensor 17 is mounted on the laser sensor arm 20, and has a wire (not depicted) that runs to the power box 22. The laser/sensor 17 emits a laser 17A, which reflects upon the reflector 18, and back up to the laser/sensor 17. The laser/sensor 17 senses the location of the reflected laser 17A, and accordingly signals the left light post 16A, the center light post 16B, and the right light post 16C. The center light post 16B illuminates once the towing vehicle 30 is aligned with a trailer 31, as depicted in FIG. 3. The left light post 16A and the right light post 16C provide a visual indication to the driver of the left to right alignment of the trailer 31.

Referring to FIGS. 2 and 3, the invention 10 attaches to the trailer 31 via the flexible spring clamp 19. Referring to FIG. 2, the spring clamp 19 has flexible ends that enable the spring clamp 19 to snap over the trailer 31.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A trailer hitch alignment aid comprising:
   (a) a mounting assembly;
      wherein the mounting assembly attaches to the tongue of a trailer by an attaching means;
   (b) a left light post and a right light post;
      wherein the left light post is attached by a mounting means along the left distal end of the mounting assembly;
      wherein the right light post is attached by a mounting means along the right distal end of the mounting assembly;
      wherein both the left light post and the right light post are capable of extending or retracting from the respective distal end of the mounting assembly;
   (c) a center light post;
      wherein the center light post is permanently affixed to the mounting assembly;
   (d) a laser/sensor;
      wherein the laser/sensor extends from the mounting assembly via a laser extender arm;
   (e) a reflector;
      wherein the reflector attaches via securing means in close proximity to the trailer hitch on a location on the towing vehicle;
      wherein the reflector is capable of reflecting the laser emitted from the laser/sensor, which then reflects the laser back up to the laser/sensor;
      wherein upon reflection of the laser to the laser/sensor, the center light post is illuminated;
   (f) a power box;
      wherein the power box includes a powering means;
      wherein wiring extends from the power box to the laser/sensor, the left light post, the center light post, and the right light post.

2. The trailer hitch alignment aid as described in claim 1 wherein the fastening means comprises bolting, welding, screwing, gluing, or a spring clamp that snaps onto the trailer.

3. The trailer hitch alignment aid as described in claim 2 wherein the spring clamp is made of a material comprising plastic, or a metal.

4. The trailer hitch alignment aid as described in claim 3 wherein the mounting means includes a locking mechanism such that the left light post and the right light post can be locked into their respective position with the distal end of the mounting assembly; and
      wherein the locking mechanism comprises a spring-loaded pin mounted on the left light post and the right light post and a corresponding plurality of holes along the distal ends of the mounting assembly.

5. The trailer hitch alignment aid as described in claim 4 wherein the power box includes an on/off switch.

6. The trailer hitch alignment aid as described in claim 5 wherein the securing means comprises an adhesive, screwing, welding, or bolting.

7. The trailer hitch alignment aid as described in claim 6 wherein the mounting assembly, the left light post, the center light post, and the right light post are made of a material comprising a metal or a plastic.

8. The trailer hitch alignment aid as described in claim 7 wherein the powering means comprises a solar cell array, a plurality of batteries, or electrical wiring that runs to the electrical system of the trailer or towing vehicle.

\* \* \* \* \*